Patented Dec. 4, 1934

1,982,787

UNITED STATES PATENT OFFICE 1,982,787

HOT MOLDING COMPOSITION

Oscar A. Cherry, Chicago, Ill., assignor to Economy Fuse & Manufacturing Company, Chicago, Ill., a corporation of New York No Drawing. Application April 28, 1930, Serial No. 448,159

2 Claims. (Cl. 106—22)

This invention relates to a new and improved molding composition of the phenolic condensation type, particularly characterized by the inclusion of an additional substance which serves to impart improved molding properties thereto.

It is customary and desirable, in the manufacture of hot molding compositions derived from phenol resins or potentially reactive phenolic condensation products, to add, at some stage, a lubricating agent.

The function of this lubricating agent is to prevent the sticking of the composition or the molded object to the hot metal molds.

Such a lubricant, for best results, must possess certain properties. It should be of such a nature that its presence in the molded objects made from the composition must not result in an impairment of the normal physical, chemical or electrical resistivities. The lubricant must be without any chemical action on the molds ordinarily employed for the hot pressing operations. Preferably the lubricating agent should be substantially water-insoluble.

It has also been the practice in preparing hot molding compositions from phenolic condensation products to add plasticizing agents. The function of these agents is to increase the thermoplastic flow of these materials or to retard the moment of final hardening under the influence of heat and pressure.

In this case, too, it is desirable that the plasticizing agent be of such a nature that the desirable properties of the molded material are not impaired.

Among the lubricants heretofore used in the art are waxes such as ozokerite and carnauba waxes, stearic acid, and metallic soaps, such as calcium stearate.

Stearic acid has a tendency to etch the steel molds in which the compositions are ordinarily molded and is thus objectionable. Calcium stearate or other metallic soaps are free from this objection but the use of too large a quantity results in decreased strength. Waxes have excellent lubricating properties but the use of them except in very small quantities results in a loss of strength.

Recently a compound of butyl alcohol and stearic acid, i. e., butyl stearate, has been proposed as a lubricant and water-proofing agent for this type of composition. Molding compositions containing more than a very small quantity of butyl stearate, do not form articles having a good appearance, due to the separation of butyl stearate and the formation of a greasy film upon the surface of the molded object. This phenomenon is probably due to a limited solubility of the ester in the final infusible phenolic condensation product.

Among the plasticizing agents heretofore used are condensation products of ortho cresol and formaldehyde, naphthaline, phthalic anhydride, aniline, asphalt, phenol and rosin. These compounds differ among themselves in their ability to plasticize the potentially reactive phenolic condensation products. None, however, possess any lubricating properties.

In the copending applications of Oscar A. Cherry and Franz Kurath, bearing Serial Numbers 266,114, now Patent 1,800,815, filed March 30, 1928, 386,484 now Patent 1,896,069 and 386,486, filed August 16th, 1929, various new compositions of matter have been described and claimed, and their use has been claimed in hot molding compositions for plasticizing or lubricating purposes, or both. One of these products so claimed is stearanilide, or broadly, any reaction product of stearic or similar acid and an aromatic amine.

Another class of products so claimed is the result of the successive reaction of an organic acid containing more than six carbon atoms and an aldehyde upon an aromatic amine. This larger class of products may have plasticizing or lubricating properties, or both. All are apparently soluble in the final infusible condensation product.

Another class of compounds has now been discovered to have both plasticizing and lubricating effects when incorporated in phenolic hot molding compositions. Such compounds are the esters obtained by reacting the chloride or anhydride of saturated aliphatic acid containing more than ten carbon atoms with a phenol. A specific example is phenyl stearate.

The amount of such compound which may be added without deleteriously affecting the molding composition or the molded objects is not definitely known. It is believed that the amount is quite large and in any event, the amount which can be so added is in excess of that necessitated in any ordinary case by lubricating or plasticizing requirements. Applicant has used as high as 7½% of phenyl stearate, the proportion being based on the phenolic condensation product.

If lubricating effects only are desired, it is necessary, as a rule, to use not over 1% of phenyl stearate. Very good plasticizing effects may be obtained by the use of 3% ester.

The advantage of using a lubricating agent which has plasticizing effects or vice versa, are obvious. In addition, this class of compounds are electrically and chemically resistant and are water repellent. They are hydrolized with difficulty. The use of even the largest amount mentioned does not noticeably affect the heat resistance of the final product. This is not true of many of the plasticizing agents heretofore proposed.

I have mentioned phenyl stearate specifically, but it will be obvious to those skilled in the art that other phenols and other acids of the class named may be used to produce a large number of esters possessing essentially similar properties.

I claim:

1. A molding composition comprising a potentially reactive phenolic condensation product and phenyl stearate.

2. A molding composition comprising a phenyl ester of a saturated aliphatic carboxylic acid containing more than ten carbon atoms and a potentially reactive phenolic resin.

OSCAR A. CHERRY.